UNITED STATES PATENT OFFICE.

RUDOLPH DAMANN, OF AUGUSTA, MISSOURI.

HAIR-RESTORATIVE.

SPECIFICATION forming part of Letters Patent No. 321,487, dated July 7, 1885.

Application filed April 6, 1885. (No specimens.)

*To all whom it may concern:*

Be it known that I, RUDOLPH DAMANN, a citizen of the United States, residing at Augusta, in the county of St. Charles and State of Missouri, have invented a new and useful composition of matter to be used as a Hair-Restorative, of which the following is a specification.

My composition consists of the following ingredients, combined in the proportions stated, viz.: Slaked lime, three (3) pounds; plumbago, one and one-half pound; borax, one and one-half pound; beeswax, three-fourths of a pound; tallow, three-fourths of a pound; salt, one-half pound; lac sulphur, one and one-half pound; coal-oil, (kerosense,) one-half gallon. Of these ingredients I take the lime and plumbago and boil same about one and one-half hours with water, until the same has the consistence of a liquid paste. I next add the borax, beeswax, tallow, salt, sulphur, and coal-oil, and boil all, with constant stirring, to produce a thorough mingling of the said ingredients. During the boiling process just stated, aqua-ammonia, from twelve to eighteen ounces, can be added; also, such other well-known ingredients as are desired to perfume the article. The composition is finally pulverized and prepared in manner ordinary to be packed in bottles; and by using thereof, from time to time, a quantity sufficient to rub over or cover the scalp, (or portion devoid of hair,) a new growth is greatly facilitated, and the hair can be restored.

What I claim and desire to secure by Letters Patent of the United States, is—

The herein described composition of matter to be used as a hair-restorative, consisting of lime, plumbago, borax, beeswax, tallow, salt, lac sulphur, and coal-oil, in the proportions specified.

RUDOLPH DAMANN.

Witnesses:
WILLIAM N. HERTHEL,
JOHN W. HERTHEL.